May 26, 1925.

W. R. PETERSON

CENTER CUTTER FOR DISK HARROWS

Filed Nov. 26, 1920

1,539,097

Inventor:-
Walter R. Peterson
By H.P. Doolittle
Atty

Patented May 26, 1925.

1,539,097

UNITED STATES PATENT OFFICE.

WALTER R. PETERSON, OF CHICAGO, ILLINOIS, ASSIGNOR TO INTERNATIONAL HARVESTER COMPANY, A CORPORATION OF NEW JERSEY.

CENTER CUTTER FOR DISK HARROWS.

Application filed November 26, 1920. Serial No. 426,449.

*To all whom it may concern:*

Be it known that I, WALTER R. PETERSON, a citizen of the United States, residing at Chicago, in the county of Cook and State of Illinois, have invented certain new and useful Improvements in Center Cutters for Disk Harrows, of which the following is a full, clear, and exact specification.

My invention relates to disk harrows and more specifically to a modified rear gang construction for tandem harrows designed for providing a center cutting device.

The objects of my invention are to embody in the construction of pivoted gang disk harrows of the tandem type, means for cutting down and cultivating the central ridge which is left between the inner disks of the front gangs and which ordinarily escapes the action of the rear gangs and to provide such means as a permanent element in one of the rear gangs of the harrow, as distinguished from the separate tooth or disk attachments heretofore used for center cutting.

I accomplish this by providing one of the rear gangs with an end disk of special form and by arranging the gangs so that this disk occupies the space between the two rear gangs of the harrow and is in alignment with the space between the inner ends of the front gangs, the construction of the disk being preferably of skeleton or open type permitting free passage of soil therethrough, thus not adding appreciably to the side thrust nor throwing the rear gangs out of balance.

With these and other objects in view, my invention consists of the organization and details of construction, or other equivalents, described in the following specification and defined in the claims. Having reference to the drawings,—

My invention is particularly adapted to be embodied in the construction of tandem harrows of the type shown in the patent to Sharp, #1,322,066, November 18, 1919, where the front and rear units are connected by flexible draft bars at each side of the harrow and where the gangs when in working position assume angles converging toward the center of the machine, but the invention may be applied to the rear section of tandem harrows of other types as well.

Figure 1:
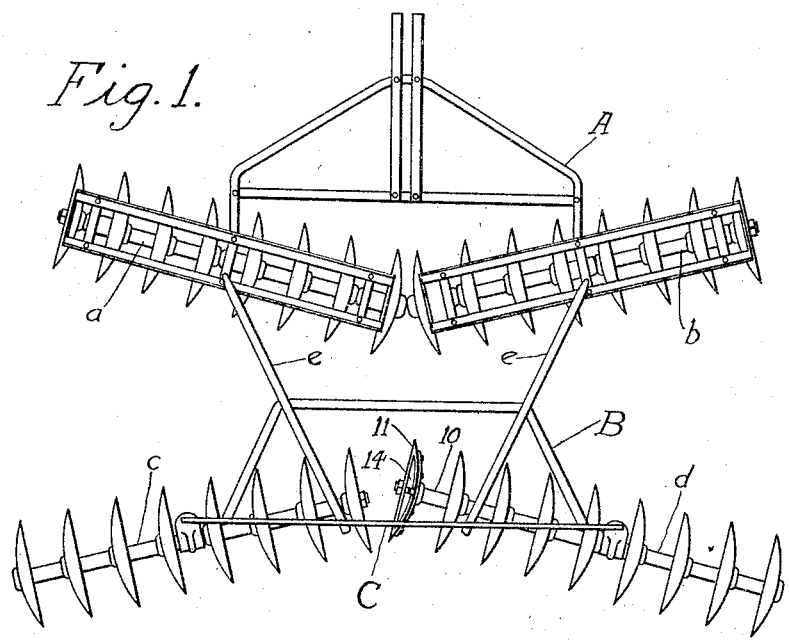
Fig. 1 is a plan view of a tandem harrow embodying my invention.
Figure 2:
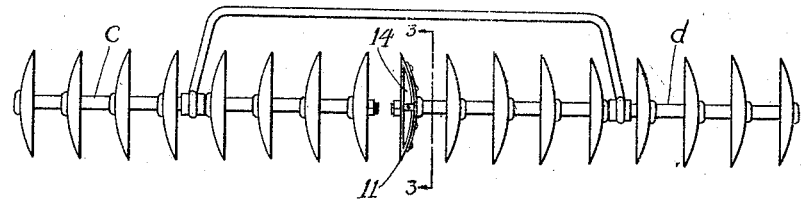
Fig. 2 is an elevation of the rear gangs showing the open disk in position.
Figure 3:
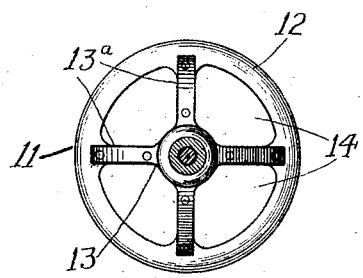
Fig. 3 is a back view of the center cutting disk taken on line 3—3 of Fig. 2.

In the present instance Fig. 1 shows a tandem harrow of the construction above mentioned comprising the front frame A carrying the rearwardly converging pivoted gangs $a$ $b$ and the rear unit B having the forwardly converging gangs $c$ $d$. These units are connected by the flexibly mounted draft bars $e$. This structure is well known and forms no part of my invention.

In connection with one of the rear gangs of the harrow, composed of the usual solid disks, as for instance, the gang $d$, I provide an inward extension 10 on the axle or shaft carrying the disks of the gang and on the end of this extension I secure a skeleton disk 11 in such a way that it constitutes an auxiliary member of the gang, being spaced from the next inner disk substantially an equal distance to that between the disks constituting the gang proper. This results in a harrow having equal numbers of disks in the front gangs and unequal numbers in the rear gangs with the odd disk positioned in alignment with the space between the front gangs. The axle extension 10 causes the disk 11 to be positioned approximately centrally of the space ordinarily existing between the inner disks of the rear gangs and practically in alignment with the space between the inner disks of the front gangs so that it engages the ridge ordinarily left at this point.

In order to reduce side thrust on the rear harrow unit it is preferable that the auxiliary disk 11 be constructed with the cutting rim 12 connected to the hub by spokes which may be reinforced by a spider member 13 on the back of the disk which has its arm 13ª riveted or otherwise secured to the spokes of the disk. This construction provides openings 14 in the auxiliary disk through which the soil has free discharge, thus causing the disk to meet with little resistance and also assisting in pulverizing the soil but it is not essential that the auxiliary disk be of open form. It will be observed that the provision of the additional center cutting disk interferes in no way with the angling and straightening of the disk gangs and that it can be attached to either one of the rear gangs with equally good results.

The invention disclosed is particularly related to tandem harrows and is in effect a modification of the gang construction of a rear or tandem section which usually comprises gangs of inthrowing disks which converge forwardly when swung to working position and necessarily leave a considerable space between the inner disks, which space in the present invention is occupied by the additional or auxiliary disk.

While I have shown a preferred form of auxiliary disk it will be evident that this is capable of considerable modification without departure from the scope of my invention as defined in the following claims:

1. A tandem harrow comprising front and rear units each provided with a pair of opposed disk gangs, the gangs of the front unit having equal numbers of disks and the rear gangs having unequal numbers, the gang with the greater number having its inner disk substantially in alignment with the space between the inner disks of the front gangs.

2. A tandem harrow comprising front and rear units each provided with a pair of opposed disk gangs, one of the rear gangs having an extension on the inner end of the axle thereof and an auxiliary earth working element mounted on the end of the extension in substantial alignment with the space between the front pair of disk gangs.

3. A tandem harrow comprising front and rear units each provided with a pair of opposed gangs composed of solid disks, one of the rear gangs having an extension on the inner end of the axle thereof and an auxiliary disk of different structure from those in the gangs mounted on the end of the extension in substantial alignment with the space between the front pair of disk gangs.

4. A tandem harrow comprising front and rear units each provided with a pair of opposed gangs composed of solid disks, one of the gear gangs having an extension on the inner end of the axle thereof and an auxiliary skeleton disk mounted on the end of the extension in substantial alignment with the space between the front pair of disk gangs.

5. The combination with the rear section of a tandem harrow comprising a pair of opposed gangs of disks, of an extension on the inner end of the axle of one of the gangs, and an auxiliary disk mounted on the end of the extension and positioned in the space between the gangs.

6. The combination with the rear section of a tandem harrow comprising a pair of opposed gangs of disks, of an extension on the inner end of the axle of one of the gangs and an auxiliary disk mounted on the end of the extension and positioned in the space between the gangs, the auxiliary disk differing in structure from those in the gangs.

7. The combination with the rear section of a tandem harrow comprising a pair of opposed gangs having equal numbers of similar disks, of an extension on the inner end of the axle of one of the gangs and an auxiliary skeleton disk mounted on the end of the extension and positioned in the space between the gangs.

8. The combination with a pair of pivotally mounted disk gangs composed of inthrowing disks, such gangs converging forwardly when in working position, of an additional disk mounted on the inner end of one of the gangs on an extension of its axle and positioned substantially midway between the inner disks of the gangs.

In testimony whereof I affix my signature.

WALTER R. PETERSON.